Sept. 12, 1933.  A. J. METZ  1,926,549
VEHICLE AXLE AND HUB
Filed Feb. 11, 1932
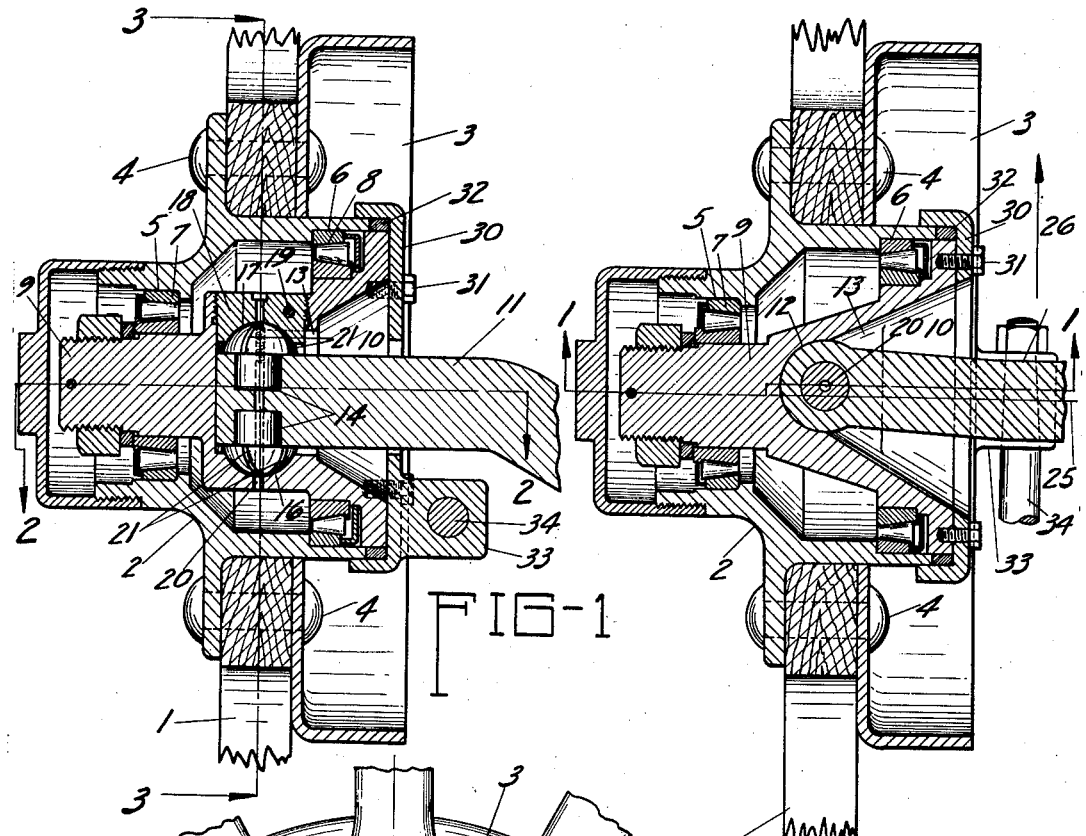
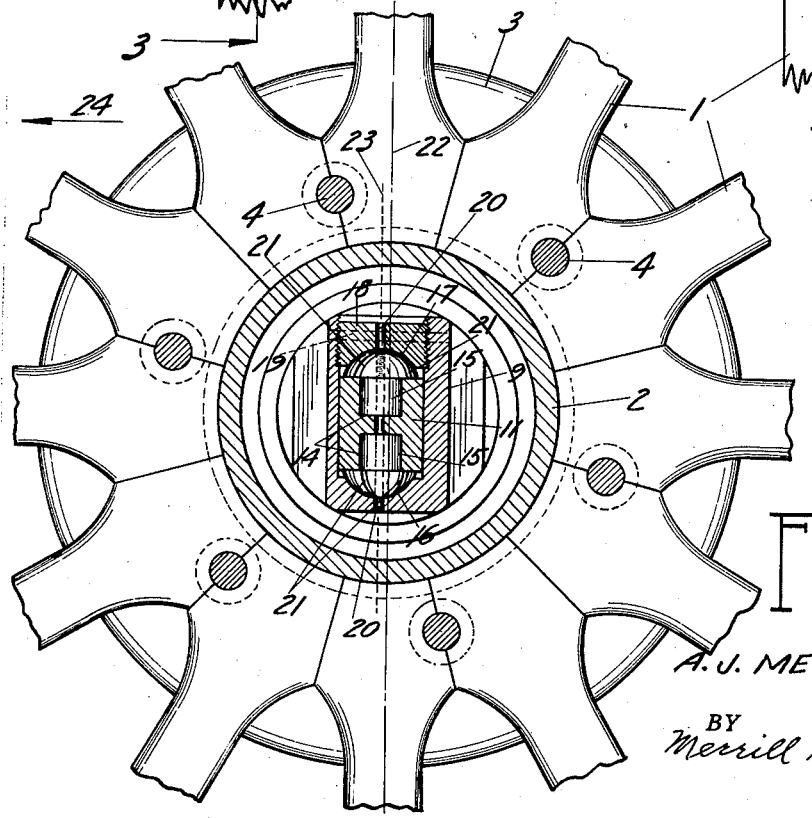
A. J. METZ INVENTOR.
BY Merrill M. Blackburn
ATTORNEY.

Patented Sept. 12, 1933

1,926,549

UNITED STATES PATENT OFFICE 1,926,549

VEHICLE AXLE AND HUB

Anthony J. Metz, Davenport, Iowa, assignor of one-third to J. R. Porter and one-third to R. C. Jones, both of Davenport, Iowa Application February 11, 1932
Serial No. 592,273

5 Claims. (Cl. 280—96.3)

The present invention relates to the construction of a vehicle axle and hub and more especially to such construction as is concerned with the turning of the wheel in the act of steering the vehicle and in normally keeping the vehicle running straight ahead. Among the objects of this invention are to so construct a mechanism of the character indicated as to eliminate the necessity for toe-in; to so construct a mechanism of the character indicated as to provide natural caster for the wheels; to provide a mechanism of the character indicated in which the tendency to shimmy is eliminated; to provide a construction of the character indicated which will eliminate wheel-fight and tromp; and such further objects, advantages and capabilities as will hereafter appear and as are inherent in the construction disclosed herein. My invention further resides in the combination, construction and arrangement of parts illustrated in the accompanying drawing and, while I have shown therein what is now considered the preferred embodiment of this invention, I desire the same to be understood as illustrative only and not to be interpreted in a limiting sense.

In the drawing annexed hereto and forming a part hereof,

Fig. 1 is a fragmentary vertical section substantially along the plane indicated by the broken line 1—1, Fig. 2;

Fig. 2 is a horizontal section substantially along the plane indicated by the line 2—2, Fig. 1;

Fig. 3 is a transverse section approximately along the plane indicated by the line 3—3, Fig. 1.

Reference will now be made in greater detail to the annexed drawing for a more complete description of my present invention. In this drawing, the spokes are denoted by the numeral 1, the hub by the numeral 2 and the brake drum by the numeral 3. These parts are secured together by suitable means 4, such as rivets, as is quite common in the art. Suitable bearing seats 5 and 6 are provided inside the hub for the bearing rings 7 and 8 which constitute parts of the hub bearings for the wheel. These bearings might be ball bearings but I have chosen to illustrate cone bearings because I believe them preferable. Inasmuch as such bearings are standard and can be purchased by anyone desiring same, I shall not go into a detailed explanation thereof.

In Fig. 2 it will be noted that the inner end of the spindle 9 is hollowed out as indicated at 10 for reception of the end of the axle 11. The extreme end of the axle is finished with a cylindrical surface, as indicated at 12, and this cooperates with a similar surface at the outer end of the extension 13 of opening 10. This arrangement furnishes a lateral thrust bearing between the axle and spindle so as to reduce to a minimum the stress upon the vertical turning axle upon which the wheel turns when the vehicle is being steered.

The outer portion of the opening 10 is frustoconical in shape, as indicated in Figs. 1 and 2, and has an extension 13 which is flattened in a vertical direction for reception of the extreme end of the axle. Sockets 14 are formed in opposite sides of the axle 11 for the reception of ball headed plugs or ball pivots 15, serving as an axle about which the wheel spindle turns when the vehicle is steered. The heads of these plugs are preferably hemispherical and thus furnish a good bearing surface for the turning of the wheel horizontally. A socket 16 is formed in a face of the extension 13 of opening 10 to receive the head of one of the plugs 15. A similar socket 17 is formed in the plug 18 for the reception of the head of the other plug 15. It will be apparent that the plug 18 can be adjusted inwardly or outwardly until the proper degree of tightness is secured at the two ends of the turning axle of the wheel. While various methods of securing the plug 18 in place may be employed, I prefer to pass a tapered pin 19 through this and the adjacent parts of the spindle, thus preventing the plug 18 from backing out and causing looseness of the bearing. If by any chance the parts of this bearing should wear so that there would be undue looseness of the parts, they may be disassembled and a thin washer placed between one of the ball heads and the top or bottom of the axle 11. A lubrication aperture 20 extends through the plug 18, plugs 15 and axle 11, opening out through the lower side of the spindle 9, as shown clearly in Figs. 1 and 3. This aperture 20 carries lubricating means to the wearing surfaces, and grooves 21 upon the hemispherical surfaces of the heads of plugs 15 receive this lubricating means and distribute it over the contacting surfaces.

In order to make it possible to readily remove the ball pivot members 15 from their sockets, the lubrication openings therethrough may be screw-threaded for the attachment of a properly screw-threaded member by means of which a pulling force may be exerted upon these pivot members. While I may provide other means for removing these ball pivot members, I believe that the method of accomplishing this described above is preferable and I have therefore chosen to illustrate this means for the accomplishment of the desired purpose. While I have shown only the upper ball pivot member as being screw-threaded, it will be understood that both the upper and lower may be, if found desirable. Instead of using this means of removing the lower pivot member, the lubrication opening through the axle might be made somewhat larger than the corresponding opening through the lower pivot member and a punch could then be inserted through the axle to drive the pivot member out of its socket in the axle.

It is now desired to call attention to the lines 22 and 23 in Fig. 3 of the drawing, the former showing the vertical line through the center of the wheel in the medial plane of the tire thereof and the latter showing the position of the turning axis about which the wheel turns during the steering operation, that is, the turing axis of the spindle. Arrow 24 in this figure shows the direction of travel of the wheel during normal forward movement and it will therefore be seen that the greater portion of the wheel is located rearwardly from the turning axis. Therefore, the theoretical point of contact of the tire with the pavement is located rearwardly from the turning axis and the wheel will therefore trail behind the vehicle axle and will be drawn along by same. This is also brought out by the line 25 in Fig. 2 which is the axial center line of the wheel and is located rearwardly from the center of the axle 11, as is obvious from this figure in which the arrow 26 indicates the direction of normal travel of the wheel. It is obvious from Fig. 1 that the axial line of the axle 11 is located below the axial line of the spindle 9. Therefore, there is a greater tendency for the vehicle to stick to the road and not bounce around so much as if the axial line of the axle were coincident with the axial line of the spindle.

In assembling the parts, the lower ball pivot member or plug 15 is inserted in its socket 14 and the end of the axle is then inserted through the opening 10 and its extension 13 until it contacts with the inner end of the latter. It is then moved downwardly until the ball head contacts with the surface 16 when the axle 11 will be just out of contact with the bottom face of the opening 13. In order to make this assembly, it is necessary that the plug 18 be out of the opening which extends through the upper part of the spindle. After these parts have been assembled as stated, the upper ball pivot member 15 is inserted through the opening in the upper part of the spindle and its shank is thrust into the upper socket 14 of the axle 11. When this is done, the axle cannot be removed from the wheel even though the plug 18 is not in place. This, therefore, serves as a safety feature preventing the wheel from dropping off from the axle in event the plug 18 should become loosened enough so that the upper ball pivot member would not be held thereby. However, there is little chance of this happening in view of the fact that after the plug 18 has been inserted and tightened up until there is a proper degree of tightness between the spindle, ball pivot members, and plug 18, the pin 19 is driven into place to hold the parts assembled.

A cap plate 30 is attached to the inner end of the spindle member 9 by means of suitable fastening devices 31, illustrated as being short hex-headed bolts. Between the cap plate 30 and the inner edge of the hub 2 is a gasket 32 to prevent the leakage of lubricant from the bearing to the brake drum. Integral with or secured to the cap plate 30 is a lug 33 to which is connected the crank arm 34 by means of which connection is made between the steering mechanism and the wheel. By increasing the diameter of the hub and the inner end of the spindle, it will be possible to increase the size of the angle between the faces of the opening 10, as illustrated in Fig. 2, thus shortening the turning radius for the vehicle.

In this specification and the appended claims, the term "longitudinal axis of the axle" has been used to denote a centrally located straight line lying in the plane defined by the two turning axes of the spindles, the same being below the axes of the spindles.

While I have shown the construction which I consider preferable and have described other forms of construction, it will of course be understood that various modifications of the disclosed structure may be made without departing from the spirit of my invention as set forth in this specification and the appended claims.

Having now described my invention, I claim:

1. A structure for the purpose indicated comprising an axle, a spindle connected to the end thereof, said spindle being adapted to oscillate in a horizontal direction, the axis of oscillation about which the spindle turns intersecting the spindle but being located forwardly of the longitudinal axis of the spindle.

2. In a structure for the purpose indicated, the combination of an axle having in its outer end a pair of sockets for the reception of ball pivots, a pair of ball pivots located in said sockets, a spindle having a socket in one end for the reception of the end of the axle, there being in a wall of the socket a socket for the reception of one of the ball pivots and, opposite this, an opening for the reception of a plug having a socket for the reception of the other ball pivot member, and a plug in said opening having a socket to receive and cooperate with said second mentioned ball pivot member in furnishing a vertical turning axis about which the spindle may oscillate in a horizontal direction.

3. In a structure for the purpose indicated, the combination of an axle, a spindle connected thereto for oscillation in a horizontal plane, and a wheel mounted on said spindle to rotate thereabout, the axis of oscillation of the spindle upon the end of the axle being located substantially in the medial plane of the wheel and forwardly of the axis of rotation of the latter about the spindle, the connection between the axle and spindle being located within the figure defined by the wheel bearings.

4. In a structure of the character described, an axle, a spindle connected thereto to oscillate in a substantially horizontal direction about an axis passing through the two, a wheel mounted for rotation about the spindle, the longitudinal axis of the axle intersecting the axis of oscillation of the spindle but being located forwardly of the longitudinal axis of the spindle.

5. In an axle assembly, a spindle having a flaring socket in one end thereof, the inner end of the socket being partially cylindrical in form, an axle having its end extending into said socket and shaped to conform to the inner end of the socket, means pivotally connecting the spindle and axle end for oscillation of the spindle about an axis concentric with the cylindrical surface of the end of the axle, and means for adjusting the pressure upon the relatively movable surfaces of the spindle and axle connecting means.

ANTHONY J. METZ.